US008306482B2

(12) United States Patent
Lee et al.

(10) Patent No.: US 8,306,482 B2
(45) Date of Patent: Nov. 6, 2012

(54) COMMUNICATION SYSTEM AND SEARCH AND RESCUE TERMINAL FOR VESSELS

(75) Inventors: Yong-Min Lee, Daejon (KR); Inone Joo, Daejon (KR); Sang-Uk Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 440 days.

(21) Appl. No.: 12/333,502

(22) Filed: Dec. 12, 2008

(65) Prior Publication Data

US 2009/0156139 A1 Jun. 18, 2009

(30) Foreign Application Priority Data

Dec. 14, 2007 (KR) .................. 10-2007-0131235

(51) Int. Cl.
*H04B 1/034* (2006.01)
(52) U.S. Cl. ...... 455/90.1; 455/404; 455/27.1; 455/445; 455/431
(58) Field of Classification Search ............... 455/404.1, 455/277.1, 445, 431, 90.1; 342/357.52, 357.31
See application file for complete search history.

(56) References Cited

U.S. PATENT DOCUMENTS

| 5,847,679 A | * | 12/1998 | Yee et al. ................ 342/357.31 |
| 6,002,363 A | * | 12/1999 | Krasner .................. 342/357.52 |
| 6,975,671 B2 | * | 12/2005 | Sindhushayana et al. .... 375/144 |
| 7,003,278 B2 | * | 2/2006 | Beni et al. .................. 455/404.1 |
| 7,233,795 B1 | * | 6/2007 | Ryden ......................... 455/445 |
| 2002/0111149 A1 | * | 8/2002 | Shoki ........................ 455/277.1 |

FOREIGN PATENT DOCUMENTS

| KR | 10-2003-0036458 A | 5/2003 |
| KR | 10-2003-0076506 A | 9/2003 |
| KR | 1020070015706 A | 2/2007 |

* cited by examiner

*Primary Examiner* — Jean Jeanglaude
(74) *Attorney, Agent, or Firm* — Fenwick & West LLP

(57) ABSTRACT

A communication service equipment and a search and rescue terminal device for vessels that are set on board to provide radio communication service including at least one radio signal transmission and reception units, a modulation and demodulation unit, a location information receiving unit, a plurality of frequency conversion unit, signal processing units each connected to the frequency conversion unit, a main control unit, and control the signal processing unit.

8 Claims, 2 Drawing Sheets

COMMUNICATION SYSTEM AND SEARCH AND RESCUE TERMINAL FOR VESSELS

CROSS-REFERENCE TO RELATED APPLICATIONS

The present invention claims priority of Korean Patent Application No. 10-2007-0131235, filed on Dec. 14, 2007, which is incorporated herein by reference.

FIELD OF THE INVENTION

The present invention relates to an apparatus for providing a communication service for a vessel and a search and rescue terminal. More particularly, the present invention relates to an apparatus for providing a communication service for a vessel and a search and rescue terminal that provides communication between the portable terminal being placed in the vessel and the coastal radio station, and sends shipwreck information and location of a wrecked vessel automatically to the rescue organizations.

This work was supported by the IT R&D program of MIC/IITA [2007-S-301-01, "Ground Station System and Search and Rescue Terminal Device Technique Development by Global Positioning System"]

DESCRIPTION OF RELATED ART

Medium frequency (MF)/High frequency (HF)/Very high frequency (VHF) radio communication system is one of the obligatorily required equipments for every vessel over 300 tons displacement that voyages overseas according to the resolution of International Maritime Organization (IMO). The MF/HF/VHF radio communication system provides maritime communication services such as direct connection to fixed line telephones in land, communication with the coastal radio station, and transmission of emergency rescue signals when the vessel is wrecked.

The search and rescue terminal device for vessels, defined as "Global Maritime Distress Safety System (GMDSS)," is also one of the obligatorily required equipments for every vessel over 300 tons displacement that voyages overseas. GMDSS sends out rescue signals on the occasion of a shipwreck to the rescue organizations through a rescue satellite so that the rescue organizations can locate the wrecked ship and receive its information.

Vessels over a certain size mentioned above should be equipped with a predetermined communication system and search and rescue terminals should be on board in case for maritime accident. The MF/HF/VHF radio communication system is used frequently receiving weathercast information, harbor operation-related information, ferriage, and anchorage harbor information through the system. On the other hand, the search and rescue terminal for vessels (GMDSS) is needed only for cases of maritime accidents. However, since there is no use for the device during normal operation, most of the captains or owners of the ship feel against equipping their ships with GMDSS mandatorily.

Despite the importance of the search and rescue terminal, many search and rescue terminals set up in ship are not properly managed and maintained. As a result, some of them malfunction, causing great risk to those who are shipwrecked.

Generally, vessels in voyage are equipped with MF/HF/VHF radio communication system to communicate with coastal radio station and send out rescue signals and get direct connection to commercial phone lines.

The MF/HF/VHF radio communication system has a relatively high utilization efficiency as it can perform digital selective calling (DSC), wireless communication, and narrow band direct printing telegraphy (NBDP) etc., and also communication in emergency situations like shipwreck through MF/HF/VHF. However, most MF/HF/VHF radio communication systems are set fixed in the ship, and the radio communication system cannot move so it is difficult to cope with emergency situations.

In case of abrupt accidents during voyage, the search and rescue terminals are automatically activated to thereby generate a beacon signal with 406 Mhz frequency. A search and rescue satellite receives the beacon signal and repeats the beacon signal to the satellite communication center on the ground. The satellite communication center locates the search and rescue terminal by calculation and transmits the information to emergency medical center through a situation control center.

The search and rescue terminal device is needed in an abrupt shipwreck, and it follows the world maritime regulation for accident as a safeguard system. When the vessel sinks to deeper than a certain depth, e.g., approximately 4 m depth, the search and rescue terminal generates a beacon signal automatically. For this reason, the search and rescue terminal device has very low utilization efficiency until critical accidents like shipwreck occurs.

Furthermore, serious side effects have occurred after introducing the world maritime accident and safeguard system. A major cause of the side effect was the confusion of the operator due to the variation in operation method according to the different manufacturers and their communication systems. This occupies almost 90% of falsely generated shipwreck signals.

SUMMARY OF THE INVENTION

An embodiment of the present invention is directed to providing a radio communication service including at least one radio signal transmission and reception unit which provides two-way communication with a coastal radio communication station using at least one of medium frequency, high frequency, and very high frequency; at least one modulation and demodulation unit connected to the radio signal transmitting and receiving unit; a location information receiving unit to collect location information; a plurality of frequency conversion unit to process two-way communication with a search and rescue terminal device, wherein the number of frequency conversion units corresponds to the numbers of channels of the search and rescue terminal device; at least one signal processing unit each connected to the frequency conversion unit configured to process a signal from/to the frequency conversion unit; and a main control unit connected between the signal processing unit and the modulation and demodulation unit, which is configured to transmit location information received from the location information receiving unit to the search and rescue terminal through the signal processing unit, and control, upon request of the search and rescue terminal, connection between the signal processing unit and the modulation and demodulation unit which is available Another embodiment of the present invention is directed to providing an apparatus for search and rescue for vessels to provide two-way communication with a coastal radio station including a channel selecting unit to select a channel among plurality of radio channels; a radio signal transmitting and receiving unit to proceed two-way communication through radio channel selected by the channel selecting unit; a storing unit to store the operating program and the information periodically received from the signal transmitting and receiving unit; and a main control unit to request service to the radio communication service equipment, to process signals received from the signal transmitting and receiving unit into voice signal and to store the information about the location.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

DESCRIPTION OF SPECIFIC EMBODIMENTS

The advantages, features, and aspects of the invention will become apparent from the following description of the embodiments with reference to the accompanying drawings, which is set forth hereinafter.

In an embodiment of the present invention, a radio communication service equipment is set on a vessel. The radio communication service equipment sends out radio frequency signals with power less than approximately 0.1 W to provide wireless communication service to the search and rescue terminal by making the vessel as an unitary service cell, allowing radio communication with the coastal radio station using medium frequency band of 1,606.5 to 4,000 KHz, high frequency band of 4,000 to 27,500 KHz and very high frequency band of 156.535 MHz. Also the radio communication service equipment includes Global Positioning System (GPS) information receiver that sends the location information periodically to every search and rescue terminal in the vessel.

The search and rescue terminal stores the periodically received updated location information from the satellite to collect precise location information of the shipwreck location and sends out the most recent location information with the emergency rescue signal.

The search and rescue terminal includes response link processing function to receive the shipwreck report message and a rescue dispatch confirmation message sent from the emergency rescue center.

The search and rescue terminal includes an input and output connection device for inputting information related to the vessel and checking the state and operation of the search and rescue terminal at the same time.

Figure 1:
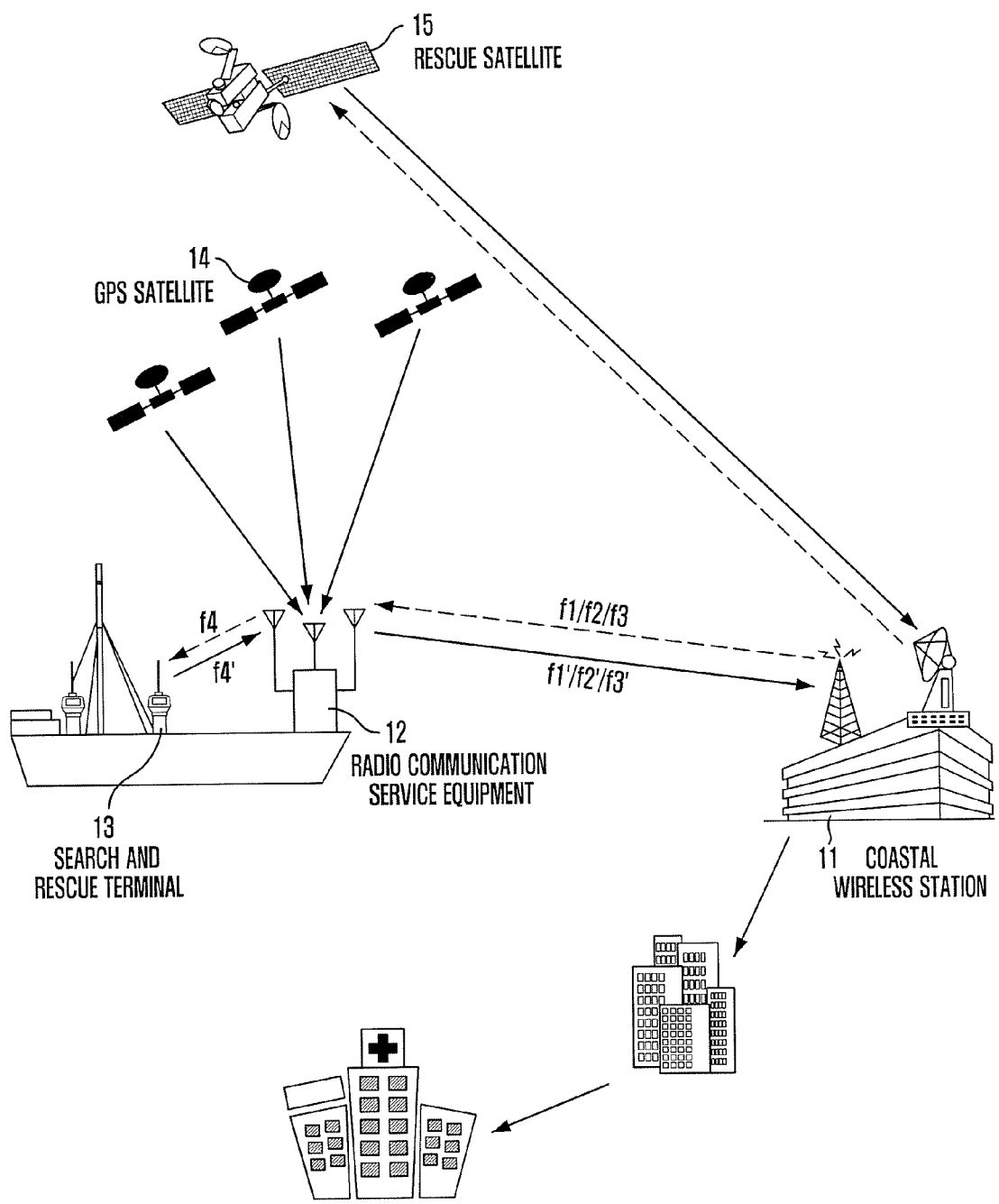
FIG. 1 illustrates a wireless communication service system for vessels to which the present invention is applied.

FIG. 1 illustrates a radio communication service system for the vessel to which the present invention is applied.

Refer to FIG. 1, a radio communication service equipment 12 is set inside the vessel. The radio communication service equipment 12 communicates with a coastal radio station 11 using medium frequency (MF), high frequency (HF) and very high frequency (VHF). Furthermore, the radio communication service equipment 12 receives location information from a GPS satellite 14 through a GPS receiver.

The radio communication service equipment 12 converts medium frequency (MF), high frequency (HF) and very high frequency (VHF) signals received from the coastal wireless station 11 into low power frequency signals to set the vessel as an unitary service cell and transfers the low power frequency signals to the search and rescue terminal device. Furthermore, the radio communication service equipment 12 converts the radio frequency signal received from the search and rescue terminal into medium frequency (MF), high frequency (HF), and very high frequency (VHF) signals and sends the MF/HF/VHF signals to the coastal radio station.

A plurality of search and rescue terminals 13 are linked to the radio communication service equipment 12 under the service area of the radio communication service equipment 12 and has a function communicating with the rescue satellite 15 to send out emergency rescue signals if the ship is wrecked.

That is, the plurality of the mobile search and rescue terminals 13 store the location information which is periodically transmitted from the radio communication service equipment 12 through the radio frequency f4, and performs two-way communication with the radio communication service equipment 12 through wireless frequencies f4 and f4'.

When the vessel is wrecked, the search and rescue terminal 13 is activated manually by the user's switch control or automatically by the seawater level sensor and sends out pre-stored location information and basic information of the vessel to a rescue satellite 15. The rescue satellite 15 repeats the rescue signal to the wireless station on the ground and the satellite communication center. The control center not only calculates the location of the wrecked ship and informs the emergency rescue center of the shipwreck but also sends the information that the accident report has been received by the emergency rescue center to the search and rescue terminal 13.

Figure 2:
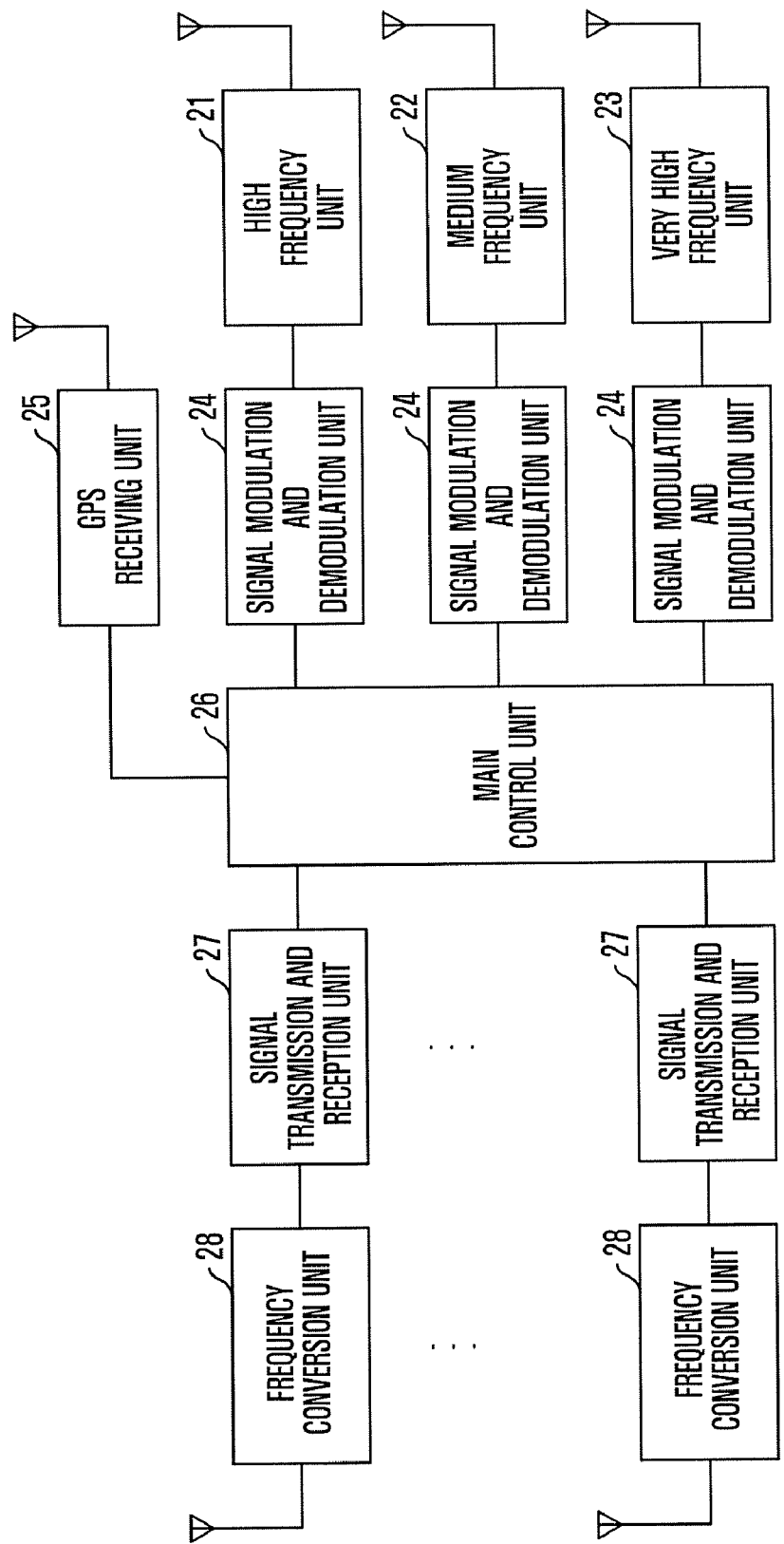
FIG. 2 is a block diagram illustrating a wireless communication service system in accordance with an embodiment of the present invention.

FIG. 2 is a block diagram of a radio communication service system equipment in accordance with the present invention. The radio communication service system equipment includes a high frequency unit 21, a medium frequency unit 22, a very high frequency unit 23, a signal modulation and demodulation unit 24, a GPS receiving unit 25, a main control unit 26, a signal transmission and reception unit 27, and a frequency conversion unit 28.

The high frequency unit 21 processes the two-way wireless communication service with the coastal radio station using the high radio frequency. The medium frequency unit 22 processes the two-way wireless communication service with the coastal radio station using the medium radio frequency. The very high frequency unit 23 processes the two-way wireless communication service with the coastal radio station using the very high radio frequency.

The signal modulating and demodulating unit 24 modulates data to be sent and demodulates received data. An embodiment of the present invention describes that each of the high frequency unit, the medium frequency unit and the very high frequency unit includes the signal modulating and demodulating unit, but this may be modified in other forms. The GPS receiving unit 25 receives the location information from GPS satellites and sends the collected information to the main control unit 26.

The main control unit 26 includes a memory device to store channel status information and location information to manage the radio channel, a switch that connects the signal transmission and reception unit 27 with the signal modulation and demodulation unit 24, and a control processor to select the available radio channel according to a stored program and to control the switch.

That is, the main control unit 26 periodically sends the collected location information which is received from the GPS receiving unit 25 to the signal transmission and reception unit so that the signal is sent to every search and rescue terminal. The main control unit 26 manages the channel operational status of the medium frequency (MF), the high frequency (HF), and the very high frequency (VHF) transmitted from the signal modulating and demodulating unit 24. That is, the main control unit 26 sends the signal to each search and rescue terminal through one of the selected channels. The search and rescue terminal is portable, and it can process information required for the voyage and also voice signals received from the coastal radio station.

There are signal transmission and reception units 27 and frequency conversion units 28 as many as the search and rescue terminals. That is, each of the signal transmission and reception units 27 and the frequency conversion units 28 communicates with the search and rescue terminal through a different radio channel from each other.

The frequency conversion unit 28 down-converts the radio frequency signals from the search and rescue terminal into baseband signals and sends the baseband signals to the signal transmission and reception unit 27, and the signal transmission and reception unit 27 up-converts the baseband signals into signals of a frequency allocated thereto and transmits the signals to the search and rescue terminal.

The signal transmission and reception unit 27 demodulates the baseband signals received from the frequency conversion units 28 and sends the signals to the main control unit 26, modulates the signals received from the main control unit 26, and transmits the signal to the frequency conversion units 28.

The main control unit 26 checks channel information for available radio channel unit among the medium frequency unit, the high frequency unit, and the very high frequency unit when voice call service request is received through the signal transmission and reception unit 27 from the search and rescue terminal, and sends the signal from the search and rescue terminal to the signal modulation and demodulation unit 24 to transmit the signal received from the search and rescue terminal through available frequency. At this time, the main control unit 26 manages the connection between the signal transmission and reception unit 27 and the signal modulation and demodulation unit 24 until the end of the service and enables the signal transmitted through the signal modulation and demodulation unit 24 to be sent to the signal transmission and reception unit 27.

In the meanwhile, the search and rescue terminal possesses radio channels as many as the number of frequency conversion units 28 in the radio communication service equipment and includes a channel selecting unit for selecting one radio channel among a plurality of radio channels, a radio signal transmitting unit for processing two-way communication with the radio communication service equipment, a memory to store location information received periodically from the signal transmission and reception unit 27 and a program, a control unit for requesting a service to the communication service equipment through the signal transmission and reception unit 27, processing signals received from the signal transmit unit into voice signals, and storing the location information in the memory.

Also, the search and rescue terminal device stores the periodically transmitted location information and includes a satellite communication module to transmit shipwreck signal that includes automatically stored location information and basic vessel information when shipwreck occurs. The search and rescue terminal also includes a display module to display a response to the response of the emergency signal through a satellite.

The search and rescue terminal of the present invention has an additional function of processing two-way communication with a wireless communication service equipment compared to conventional search and rescue terminals. The explanation related to the search and rescue terminal will be omitted since those techniques can be easily realized by those skilled in the art.

The present invention maximizes the usage of the search and rescue terminal by utilizing the search and rescue terminal which has to be set up in the vessel mandatorily, as a portable radio communication device in normal times, and as a device for reporting the emergency situation and the accidental location efficiently during emergency situation.

The present invention increases the possibility of saving lives as it reduces the mandatory burden of possessing the search and rescue device in the vessel for the owners of the vessel since the search and rescue device can also be used as a communication device during normal times.

The present invention can shorten rescue time since it is possible to locate the exact shipwreck location by periodically storing information about the vessel provided by the radio communication system in the vessel.

The present invention includes a response message transacting unit which receives messages from an emergency rescue center checking whether the rescue signal has been reported to the emergency rescue center so that the victim can calmly wait for rescue.

While the present invention has been described with respect to the specific embodiments, it will be apparent to those skilled in the art that various changes and modifications may be made without departing from the spirit and scope of the invention as defined in the following claims.

What is claimed:

1. An apparatus for providing radio communication service in a vessel, comprising:
    at least one radio signal transmission and reception unit which provides two-way communication with a coastal radio communication station using at least one of medium frequency, high frequency, and very high frequency;
    at least one modulation and demodulation unit connected to the radio signal transmission and reception unit;
    a location information receiving unit for receiving location information;
    a plurality of frequency conversion units, for processing two-way communication with a search and rescue terminal placed on the same vessel as where the apparatus for providing radio communication service is placed, wherein the number of frequency conversion units corresponds to the number of channels of the search and rescue terminals;
    at least one signal processing unit configured to process a signal from/to the frequency conversion unit; and
    a main control unit connected between the signal processing unit and the modulation and demodulation unit, which is configured to transmit location information received from the location information receiving unit to the search and rescue terminal through the signal processing unit, and control, upon request of the search and rescue terminal, connection between the signal processing unit and the modulation and demodulation unit which is available,
    wherein the search and rescue terminal is configured to communicate emergency rescue signals to a rescue satellite in case of emergencies.

2. The apparatus of claim 1, wherein the signal transmission and reception unit includes:
    a $1^{st}$ radio signal transmission and reception unit configured to transmit and receive a high frequency wave signal;

a 2$^{nd}$ radio signal transmission and reception unit configured to transmit and receive a medium frequency wave signal; and a 3$^{rd}$ radio signal transmission and reception unit configured to transmit and receive a very high frequency wave signal.

3. The apparatus of claim 2, wherein the modulation and demodulation unit includes:

a 1$^{st}$ modulation and demodulation unit connected to the 1$^{st}$ radio signal transmission and reception unit;

a 2$^{nd}$ modulation and demodulation unit connected to the 2$^{nd}$ radio signal transmission and reception unit; and a 3$^{rd}$ modulation and demodulation unit connected to the 3$^{rd}$ radio signal transmission and reception unit.

4. The apparatus of claim 3, wherein the main control unit manages radio channel status information collected through the 1$^{st}$ to 3$^{rd}$ modulation and demodulation units and selects an available radio channel based on the radio channel status information.

5. The apparatus of claim 4, wherein the main control unit manages information on which signal processing unit is connected to which modulation and demodulation unit until the end of a service.

6. The apparatus of claim 3, wherein the main control unit includes:

a memory for storing the radio channel status information for managing a radio channel and the location information;

a switch for connecting a corresponding one of the signal processing units and a corresponding one of the modulation and demodulation units; and a control processor for selecting available radio channel according to a predetermined program and controlling the switch.

7. A search and rescue apparatus set up in a vessel and configured to communicate with a radio communication service equipment providing two-way communication with a coastal radio station, comprising:

a channel selecting unit for selecting a radio channel among a plurality of radio channels;

a radio signal transmitting and receiving unit for performing two-way communication with the radio communication service equipment placed on the same vessel as where the search and rescue apparatus is placed through a radio channel selected by the channel selecting unit;

a storing unit for storing program and location information received from the radio communication service equipment via the signal transmission and reception unit; and a main control unit for requesting a service to the radio communication service equipment, processing signals received from the signal transmission and reception unit into voice signals, and storing the location information, wherein the search and rescue terminal is configured to communicate emergency rescue signals to a rescue satellite in case of emergencies.

8. The apparatus of claim 7, wherein the main control unit automatically transmits the emergency signal including the location information and basic information about the vessel to the rescue satellite, and displaying a response to the emergency signal through the rescue satellite.

* * * * *